United States Patent
Bader et al.

[11] 3,970,616
[45] July 20, 1976

[54] SYNTHESIS OF CHROME-COMPLEXED DYE DEVELOPERS IN THE PRESENCE OF WEAKLY BASIC ANION EXCHANGE RESINS

[75] Inventors: Henry Bader, Newton Center; Michael H. Feingold, Woburn, both of Mass.

[73] Assignee: Polaroid Corporation, Cambridge, Mass.

[22] Filed: Nov. 21, 1973

[21] Appl. No.: 418,059

Related U.S. Application Data

[63] Continuation-in-part of Ser. No. 211,708, Dec. 23, 1971, abandoned.

[52] U.S. Cl. .......................... 260/147; 260/146 R; 260/208
[51] Int. Cl.$^2$ .................. C09B 45/00; C09B 45/06; C09B 45/16; C09B 45/26
[58] Field of Search .............................. 260/147

[56] References Cited
UNITED STATES PATENTS

| | | | |
|---|---|---|---|
| 2,708,193 | 5/1955 | Pfitzner et al. ..................... | 260/147 |
| 2,871,232 | 1/1959 | Csendes ............................. | 260/147 |
| 3,301,845 | 1/1967 | Hosokawa et al. ............... | 260/146 R |
| 3,356,671 | 12/1967 | Johnson et al. ................... | 260/147 X |
| 3,399,186 | 8/1968 | Hosokawa et al. ................ | 260/148 |
| 3,551,406 | 12/1970 | Idelson .............................. | 260/147 |

*Primary Examiner*—Floyd D. Higel
*Attorney, Agent, or Firm*—John P. Morley

[57] ABSTRACT

An improved method for preparing a compound of the formula:

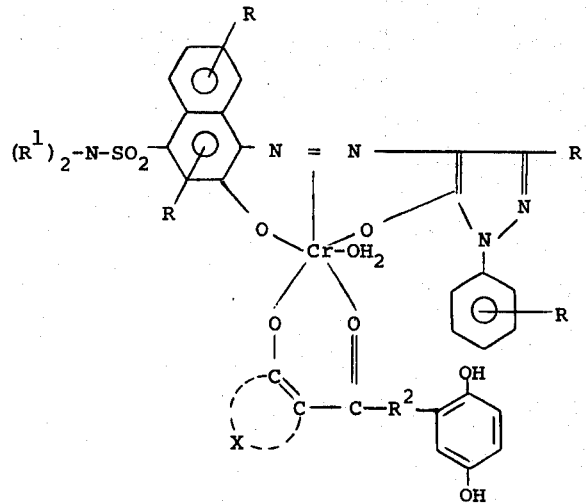

Where each R can be hydrogen, an alkyl substituent, preferably having from 1–6 carbon atoms or an alkoxy substituent preferably having from 1–6 carbon atoms and each $R^1$ is hydrogen or an alkyl or an alkanol group. $R^2$ is an alkylene radical having from 1–6 carbon atoms and X represents the atoms to complete a cyclopentyl or cyclohexyl ring.

Metal complexed dyes of the above formula are especially useful in the preparation of photographic image patterns.

The improved feature of the method presented involves the preparation of compounds of formula 1 in the presence of weakly basic anion exchange resins to obtain high yields of especially high purity products.

4 Claims, No Drawings

3,970,616

SYNTHESIS OF CHROME-COMPLEXED DYE DEVELOPERS IN THE PRESENCE OF WEAKLY BASIC ANION EXCHANGE RESINS

CROSS-REFERENCE TO RELATED PATENT APPLICATIONS

This application is a continuation-in-part of U.S. application Ser. No. 211,708 filed Dec. 23, 1971, and now abondoned.

BACKGROUND OF THE INVENTION

1. The Field of the Invention

This invention relates to photography. More precisely, the invention disclosed herein relates to an improved method for preparing intermediates for the formation of metal complexed dyes useful in the formation of photographic image patterns.

2. Description of the Prior Art

Compounds conforming to the following formula are known to the art,

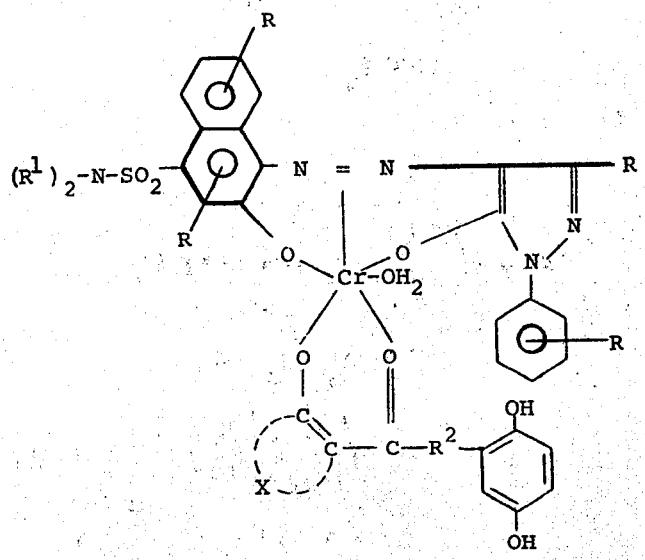

FORMULA 1

Wherein each R can be hydrogen, an alkyl substituent, preferably a lower alkyl substituent having from 1-6 carbon atoms or an alkoxy substituent preferably a lower alkoxy substituent having from 1-6 carbon atoms, $R^1$ is hydrogen or an alkyl or alkanol group preferably having from 1-8 carbon atoms. $R^2$ is an alkylene radical having from 1-6 carbon atoms, and X represents the atoms to complete a cyclopentyl or cyclohexyl ring. Details relating to compounds of the above formula can be found in commonly assigned U.S. Pat. No. 3,551,406 and U.S. Pat. No. 3,563,739 both issued to Elbert M. Idelson on Dec. 29, 1970 and Feb. 16, 1961 respectively. A representative compound conforming to Formula 1 is as follows:

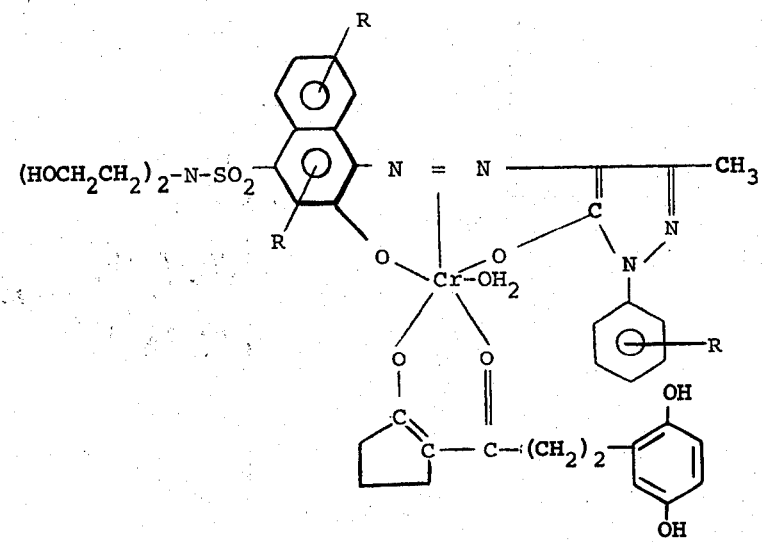

Various procedures for preparing chrome complexes of Formula 1 are disclosed in U.S. Pat. No. 3,551,406. For example, one of these disclosed syntheses employed prior to the present invention in an effort to obtain the desired chrome complexes on a production scale includes the steps of 1. reacting the non-complexed azo dye with a chromic salt to form a chrome complex thereof;

2. reacting this complex with a protected derivative of the desired ligand-developer, e.g., a derivative wherein the hydroxyl groups of the dihydroxyphenyl silver halide developing substituent are replaced with cathyloxy (—OCOOC$_2$H$_5$) groups to form the corresponding 1:1 chrome complex; and 3. hydrolyzing to remove the protective groups and to form the desired dihydroxyphenyl substituent, thereby forming the desired chromium complex.

This sequence of reactions may be illustrated as follows:

[1] 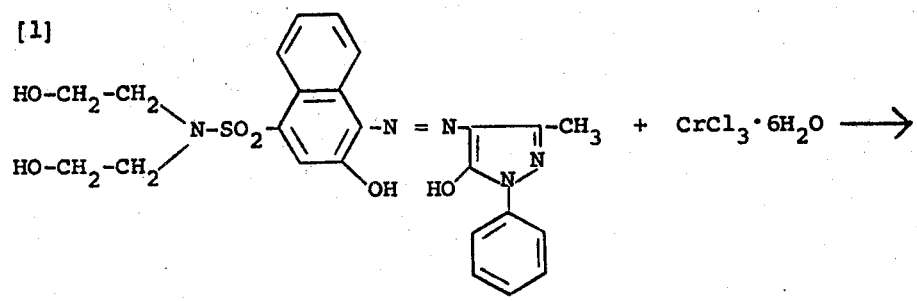

I

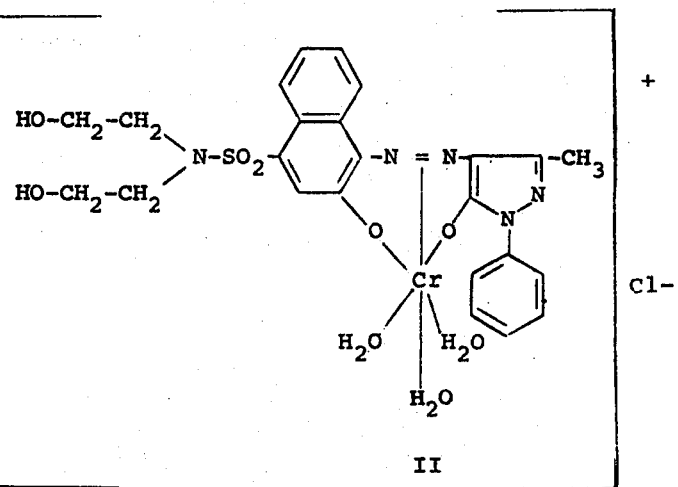

II

[2] II + 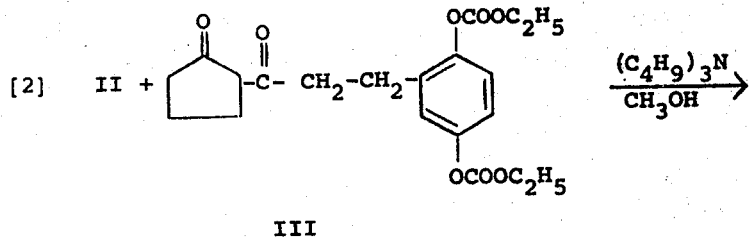

III

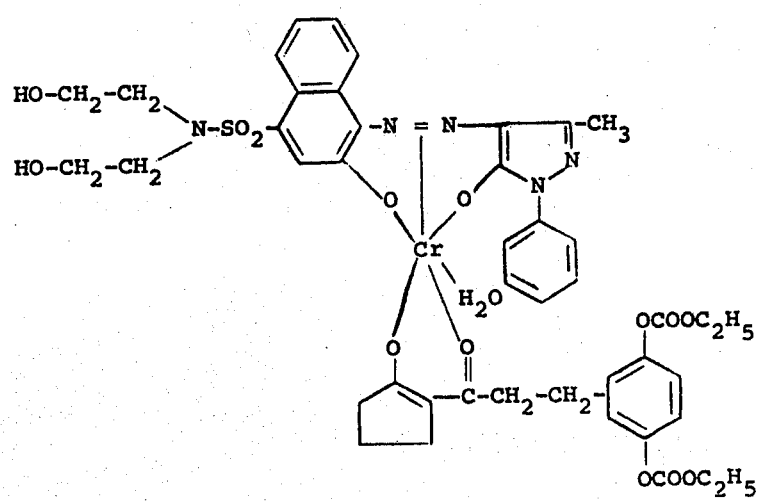

IV

[3]  IV + NaOH $\xrightarrow{\text{MeCell}}$

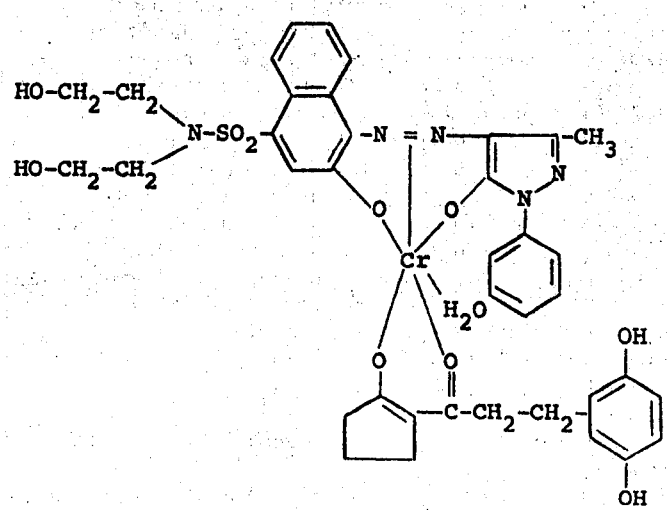

This method of synthesis has certain disadvantages from the standpoint of large scale production, chief of which are the need for the "deblocking" step of removing the protective groups, the inherent problem of having one of the protected derivatives remaining, and the fact that the alkali employed in the deblocking step causes some removal of the ligand from the complex as well as formation of oxidation product and alkali product contaminants.

Accordingly, a particularly preferred system for preparing the desired chrome complexes in large scale production would be one of the other alternative syntheses disclosed in the patent employing the free dihydroxyphenyl ligand-developer, thereby eliminating the third step and the problems inherent in the use of the protected derivative. For this reason, prior to the present invention efforts were directed to this latter synthetic group.

Early in the synthesis work for preparing these chrome complexes it was discovered that a base, e.g., an amine such as triethylamine, was needed as an acid acceptor in order to make the ligand react with the chrome complex formed in step one. While the exact reaction mechanism with this amine is not entirely understood, it is known that the amine reacts with or in some way "picks up" the acid, e.g., the hydrochloric acid formed by the chroming reaction illustrated above in step one. However, while the chrome compound formed in step one may be reacted with the free ligand-developer in the presence of such a base to form the desired 1:1 chrome complex including the ligand-developer moiety, it has been found that certain reaction by-products are produced which may be regarded as impurities and which are not easily separable from the desired chrome complex. These impurities are apparently reaction products between the amine and the azo dye, perhaps due to the amine "competing" with the ligand-developer in the second reaction step. Thus, if the amine reacts with the azo dye faster than does the ligand, the wrong product will be obtained. It has been found that the use of more hindered amines such as tri-n-butyl amine or ethyldiisopropylamine could be advantageously employed to avoid formation of impurities in an analagous reaction described in commonly assigned copending application Ser. No. 164,103 filed July 19, 1971 by Henry Bader and Edwin J. Jahngen, Jr. wherein a dihydroxyphenyl ligand was reacted with a yellow dye chromophore. However, despite the use of more hindered amines, in the present reaction between the ligand developer and the chrome complexed compound of step 1, enough of this impurity is obtained to adversely affect the contemplated use of this chrome complex in color photography. To appreciate the nature and seriousness of this problem, some basic knowledge of the function of the chrome complex in preparing color images is necessary.

These complexes are intended primarily for use as one of the three dyes in a film unit intended for preparing multicolor images in accordance with the color diffuson transfer procedures described and claimed in U.S. Pat. No. 2,983,606.

In such procedures a photosensitive element intended for accurate color reproductions of the original subject matter will be of the so-called "tripack" configuration including three sets of selectively sensitized silver halide layers, each having a dye developer (a) dye which is also a silver halide developing agent) of specified color associated therewith:

1. a silver halide layer sensitive to red light having a cyan dye developer associated therewith;
2. a silver halide layer sensitive to green light having a magenta dye developer associated therewith; and
3. a silver halide layer sensitive to blue light having a yellow dye developer associated therewith.

When a film unit of this configuration is exposed to visible light to provide a developable image and is then contacted with an aqueous alkaline solution which permeates through the respective layers and dissolves the aforementioned dye developers, each dye developer develops the exposed and, therefore, developable silver halide grains of the associated silver halide layer and is in turn oxidized to provide an oxidation product of the dye developer which is less soluble and less diffusible in the aqueous alkaline solution than is the unoxidized (unreacted) dye developer. There is thus provided an imagewise distribution of unoxidized dye developer in terms of unexposed areas of the associated silver halide layer, which imagewise distribution is free to diffuse or be transferred by imbibition to a superposed dyeable stratum to impart thereto a color transfer image. When none of the three silver halide layers are exposed in a given area, none of the dye developers associated therewith are oxidized and hence all three are available to transfer to provide a black image corresponding to these three areas. In other words, these three dyes together provide a black color. Conversely, when all three silver halide layers are exposed in a given area, all three dye developers are in turn oxidized as a function of development of these areas and no dye should be transferred, so that the transfer image should appear to be white in these areas. If only one of these silver halide layers is exposed and thus rendered developable, the other two dyes should be free to transfer to provide a color aproximating the color of the light exposing that one layer. For example, assume that the magenta dye developer is one of the chrome complexes to which this invention is directed and is therefore associated with the green-sensitive silver halide layer. When green subject matter is photographed, the green light reflected from this subject matter selectively exposes the green-sensitive silver halide layer and does not render the other two silver halide layers developable. When the thus exposed element is thereafter developed, only the magenta dye developer which develops the associated green-sensitive (exposed) silver halide layer is oxidized and thereby immobilized and the yellow dye developer and cyan dye developer associated with the other two silver halide layers is transferred to the dyeable stratum. Since cyan plus yellow dye provide a green color, the original green subject matter is reproduced. In like manner the various other colors of the visible stratum are reproduced so that if the sensitometric design of the film unit as well as its efficiency is optimum, accurate or faithful color image reproductions of the original subject matter are provided. On the other hand, if dye is transferred which should not be transferred or, conversely, if insufficient dye intended to be transferred is not transferred, the quality of the resulting dye transfer image will suffer accordingly.

With the foregoing background information in mind, the problem of having the aforementioned impurities caused by the amine reacting with the azo dye present along with the desired chrome complex will best be appreciated. These impurities may be of substantially the same color, i.e., possess substantially the same spectral absorption characteristics of the desired chrome complexes. While the presence of such an impurity of substantially the same color would not necessarily be detrimental in non-photographic applications of dye, e.g., in the dying of a fabric or the like, the presence of such an impurity seriously effects the quality of a photographic image employing a chrome complex including such impurities in the aforementioned photographic system for preparing dye images. The impurity will have no developing substituent attached as does the desired chrome complex. Thus, there is no imagewise control of the impurity and instead of being oxidized and thereby immobilized in order to have selective imagewise transfer of this particular color, the impurity will be free to transfer and will therefore diffuse to the dyeable stratum both in exposed and in non-exposed areas of the associated silver halide layer. Accordingly, in areas where no magenta dye is intended, this magenta (or whatever other color it may be) impurity will appear. Areas of the transfer image which are intended to appear white will, therefore, appear faintly colored or altered by this impurity. In like manner, due to the presence of this impurity, the colored or other image areas intended to be magenta-free will also be stained and the color of the image thus adversely effected by the presence of this impurity.

It is to this problem that the present invention is directed.

BRIEF SUMMARY OF THE INVENTION

In accordance with the present invention, unexpectedly high yields of material of very high purity are obtained by performing the second of the above-mentioned steps (wherein the chromium compound formed by reacting the non-complexed dye with a chromic salt is reacted with the free ligand-developer) in the presence of a weakly basic ion exchange resin of the type heretofore known in the art. The present invention is, therefore, directed to a novel synthesis of the aforementioned 1:1 chrome-complexed azo dye developers including the desired free ligand-developer and in the presence of an insoluble weakly basic ion exchange resin, the essence of the invention being including this ion exchange resin in the latter reaction step.

As was previously discussed, the present invention is directed to a novel method for preparing 1:1 chrome-complexed dyes of the class described and claimed in U.S. Pat. No. 3,551,406. [The photographic use of these dyes is described and claimed in U.S. Pat. No. 3,563,739.]

In accordance with the invention the corresponding complexible dye, e.g., an ortho, ortho'-dihydroxy-azo dye is first reacted with a suitable chromic salt, e.g., chromic chloride, chromic acetate, etc., to form a chromium complex in accordance with procedures known before the present invention; and the resulting chromium complex is thereafter reacted with the free ligand-developer to form the desired 1:1 chromecomplexed dye developer, the essence of the invention being performing the latter step in the presence of a weakly basic ion exchange resin to obtain the beneficial results discussed previously in the "Background of the Invention."

This sequence of reactions may be illustrated as follows by reference to the preparation of an illustrative complex of this invention:

[1]

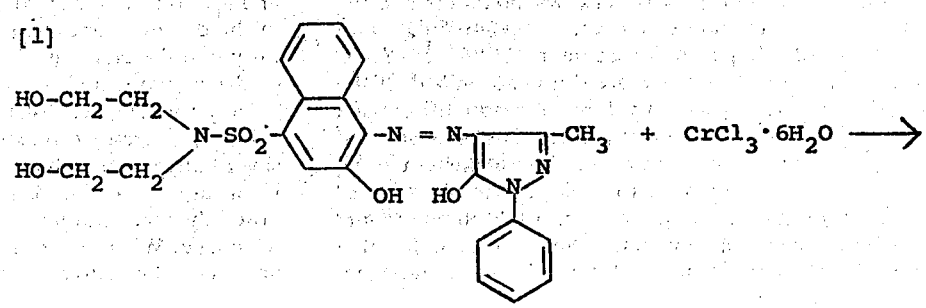

I

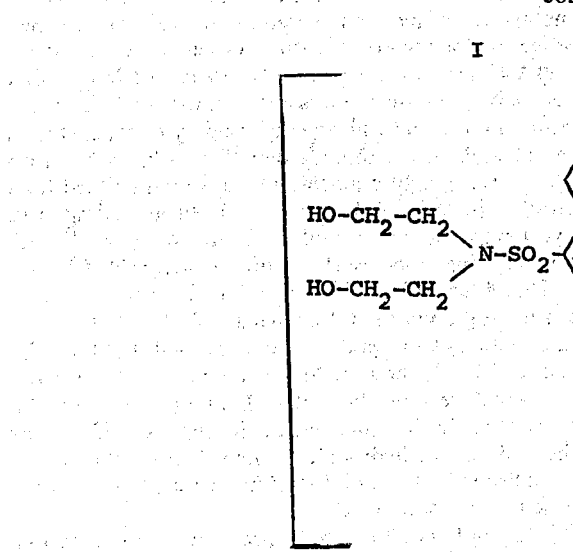

[2] II + 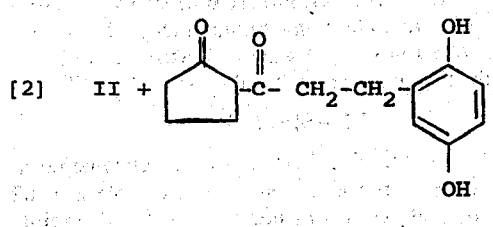

FORMULA 3

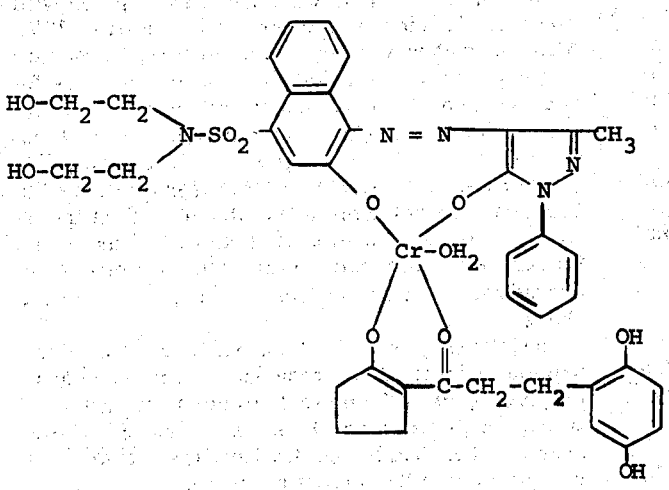

The first step of the synthesis may be performed by refluxing a solution of stoichiometric amounts of the non-complexed dye and chromic salt in a suitable organic solvent to form the chrome complex intermediate, which may be recovered from the reaction mixture by adding an aqueous solution of a strong mineral acid, e.g., hydrochloric acid, to the reaction mixture to precipitate the chrome complex. It may thereafter be separated by conventional techniques such as centrifuging and then dried. It has been found to be advisable to have vigorous agitation and to maintain the reflux during the addition of the acid solution to avoid local and premature precipitation of material much of which may be undesired impurities. A preferred class of organic solvents for this reaction are the alcohols. Most preferred are the higher boiling alcohols, e.g., isopropanol, methyl cellosolve, etc., having boiling points on the order of at least 80°C. With these higher boiling solvents (as distinguished, for example, from methanol), the chroming step has been found to occur appreciably faster.

The second step wherein the chrome complex intermediate prepared in step 1 is reacted with the free ligand-developer to form the desired 1:1 chrome-complexed azo dye developer may be accomplished simply by heating (e.g., to about 70°–75°C) a solution of stoichiometric amounts of the chrome intermediate and the free ligand-developer and a weakly basic anion exchange resin in a suitable organic solvent, e.g., an alcohol such as is employed in step 1. Recovery of the chrome complex from the reaction mixture may be accomplished by precipitation from solution by addition of a weak acid solution (e.g., 1% HCl) or by the addition of hot water (e.g., 90°C) followed by routine liquid-solid separation techniques, e.g., filtration, centrifuging etc. In a preferred system, the reaction mixture is first filtered to remove the resin, the chrome complex is then precipitated from the filtrate in the aforementioned manner, washed with water to remove water-soluble impurities and then dried. While not necessary to the practice of the present invention, for otimum purity in its contemplated usage, the resulting product is preferably recrystallized by redissolving the product in an organic solvent, and selectively adding an optimun amount of water washing again and then drying. As was mentioned previously, the essence of the present invention is the employment of a weakly basic anion exchange resin in step 2. Weak base ion exchange resins are well known in the art and any of these heretofore known ion exchange resins which are referred to by those skilled in the art as weak basic ion exchange resins may be employed. In general these exchange resins are primary, secondary or tertiary amines on a polymeric backbone. As examples of such resins, mention may be made of those "Dowex" (trademark of Dow Chemical Co. for a series of synthetic ion-exchangers); "Duolite" (trademark of Chemical Process Co. for a family of stnthetic ion exchange resins); "Ionac" (trademark of Ionac Chemical Co.) and "Amberlite" (trademark of Rohm and Haas for a line of insoluble cross-linked polymers) ion exchange resins which are referred to in the art and classified as weak ion exchange resins. Typical of such resins are "Dowex 3" (Dow Chemical Co.) and "Amberlite IR-45" (Rohm and Haas). The amount of resin employed is per se not critical, but should be no less than one equivalent based on the available "active sites"; and the particular amount of a given resin to be employed in the practice of this invention will be readily apparent to one skilled in the art.

The following examples show by way of illustration and not by way of limitation the preparation of a 1:1 chromecomplexed azo dye developer in accordance with this invention.

EXAMPLE 1

A mixture of 12.0 g. (0.0235 mole) of Superchrome Red Sulfonamide, [prepared in the manner disclosed in the copending application of Bader et al., Ser. No. 187,157, filed Oct. 6, 1971] and of 12.0 g. (0.045 mole) of chromium chloride hexahydrate in 155 ml. of isopropanol was stirred and heated under reflux for 20 hours.

Hydrochloric acid (800 ml., 10% solution) was then slowly added to the solution, so that the temperature was maintained at 90°-100°C. When the addition of the dilute acid was complete, the solution was allowed to cool with stirring at 0°C for 8 hours.

The crystalline product was filtered, washed with three 25 ml. portions of 1% hydrochloric acid, and dried at room temperature. The yield was 14.17 g. (93%) of the chrome complex intermediate (II) of the illustrative equation.

EXAMPLE 2

A solution containing 31 g. (0.0477 mole) of the chrome intermediate of the Example 1, 11.9 g. (0.0477 mole) of the ligand-developer of formula (6) and 24 g. of "Amberlite IR-45" ion exchange resin in 118 ml. of methyl cellosolve, was heated at 70°-75°C for 7 hours while stirring vigorously. The solution was then filtered and the resin was washed with 50 ml. of hot methyl cellosolve. The filtrate was added slowly to 1.8 l. of 1% hydrochloric acid while stirring rapidly to precipitate a product which was separated by filtration, washed with water until a light pink filtrate was obtained, and then dried to provide 36.4 g. of the 1:1 chrome-complexed dye developer of forumula Formula 4, (page 11). A typical sample shows absorption at $\lambda_{max}^{DMSO}$ 570 m$\mu$ $\epsilon$=25,400 and 80 $_{max}^{DMSO}$ 535 m$\mu$ $\epsilon$=21,000. Thin layer chromotography (TLC) on silica with 90:10 ethyl acetate-methanol shows the product with $R_f$ 0.49, a faint spot at $R_f$ 0.76, and medium spots at 0.31 and 0.69.

In the foregoing illustrative Example the precipitation of the chrome intermediate in step 1 ws effected by the addition of hydrochloric acid. It may also be accomplished by the addition of hot water, e.g., at a temperature of about 90°C.

While not necessary to the practice of this invention, the 1:1 chrome-complexed dye developers prepared in accordance with this invention are preferably recrystallized in order to obtain maximum purity of this dye complex. The following Example illustrates how this recrystallization may be accomplished.

EXAMPLE 3

A solution containing 7.75 g. of the chrome-complexed dye developer as prepared in Example 2 in 62 ml. of methylcellosolve was heated to 90°C. as rapidly as possible. While maintaining the temperature at 85°-90°C., 124 ml. of hot (~80°C) water was added over a 5 minute period. The mixture was stirred and allowed to cool for 15 minutes reaching a temperature of 70°C. A cooling bath was applied for 15 minutes, the mixture reaching a temperature of 3°C. The product was filtered, washed with water and oven dried in vacuo over $P_2O_5$ giving 6.9 g. (89%) of product. This material absorbs at $\lambda_{max}^{DMSO}$ 572 m$\mu$ $\epsilon$=26,500 and $\lambda_{max}^{DMSO}$ 535 m$\mu$ $\epsilon$=23,300. A TLC on the system described in Example 2 shows the product at $R_f$ 0.49, a faint spot at $R_f$ 0.00 and a very faint spot at $R_f$ 0.73. If necessary, further purification may be obtained by a second recrystallization performed in the manner described above.

The following Examples 4 and 5 illustrate procedures heretofore involved in producing chrome complexed dye developers of the present invention. As mentioned such procedures involved the use of more hindered amines rather than the weakly basic ion exchange resins employed in the present invention.

EXAMPLE 4

A solution of 6.51 g. (0.01 mole) of the chrome complexed dye as prepared in Example 1, in 50 ml. of methyl cellosolve, was heated on a steam bath to 70°-75°C. A solution containing 2.60 g. (0.01 mole) of the ligand developer of formula (6) and 1.85 g. (0.01 mole) of tri-n-butylamine in 30 ml. of methyl cellosolve was added dropwise over 30 minutes. Thin-layer chromatography showed the reaction to be complete after one hour. The solution was cooled to room temperature, filtered and added dropwise to 400 ml. of ice-cold 10% solution of hydrochloric acid. The product was filtered, washed with water and oven dried in vacuo at 40°C. The yield of the crude product of 8.20 g. was nearly quantitative. Thin-layer chromatography (silica, 90:10 ethyl acetate-methanol) showed the product at $R_f$ 0.49 and two major purple bands at $R_f$ 0.20 and 0.25 beside some weak bands. The purple bands were shown to correspond to chromed dye-amine complexes.

The crude product was heated to 90°C. in methyl cellosolve (8 ml./1 g.). Hot water (8ml./1 g.) was added slowly while maintaining the temperature at 90°C. The mixture was allowed to cool to room temperature, then was filtered, washed with water and oven dried in vacuo at 40°C. The yield was typically 55–60% of analytically good dye developer. TLC showed mostly the desired product with $R_f$ 0.49.

EXAMPLE 5

A solution containing 2.60 g. (0.01 mole) of the ligand developer of formula 3 (page 12) and 1.85 g. (0.01 mole) of tri-n-butylamine in 15 ml. of methanol was heated at reflux. Chrome-complexed dye of the Example 1, (6.51 g.; 0.01 mole) in 30 ml. of methanol was added dropwise over 30 minutes. After 90 minutes, the mixture was cooled to room temperature and filtered from the insolubles (dye-amine complexes are poorly soluble in methanol). Dropwise addition of the filtrate to 400 ml. of 10% ice-cold hydrochloric acid, followed by filtration, water wash and oven drying in vacuo gave an 84% yield of the crude dye. It was recrystallized in the same manner as shown in Example 4, yielding 5.80 g. of a product pure by TLC. Overall yield 61.4%.

As can be seen from the above, performing the step of reacting the chrome intermediate with the free ligand-developer in the presence of an ion exchange resin in accordance with this invention produces commercially acceptable yields in excess of 90%. While the yields obtainable by employing an amine such as tertiary-n-butylamine in lieu of the resin can be considered commerically acceptable, nevertheless the product produced thereby is materially inferior due to the presence of the impurities which result in staining and/or dirty highlight (white) areas of a color image produced from a multicolor negative employing the chrome-complexed dye developer as one of the imaging dyes. On the other hand, employment of the chrome-complexed azo dye developer prepared by the present invention is completely satisfactory in this respect, giving no observable staining to affect adversely the quality of the resulting color image.

Since certain changes may be made in the above process without departing from the scope of the invention herein involved, it is intended that all matter contained in the above description shall be interpreted as illustrative and not in a limiting sense.

What is claimed is:

1. In a process comprising the step of reacting a compound of the formula:

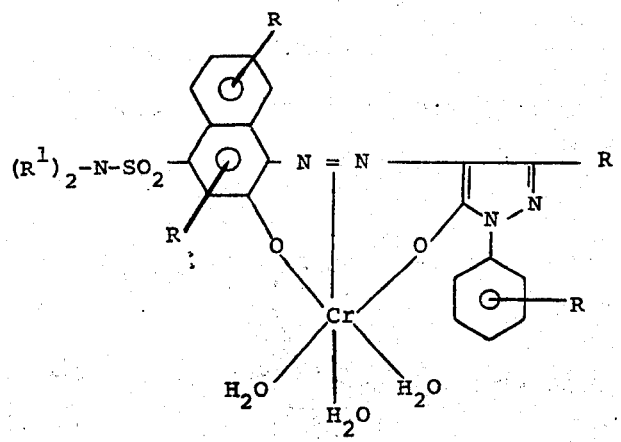

with a compound of the formula:

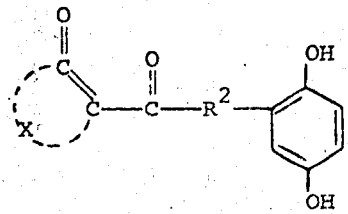

to provide a compound of the formula

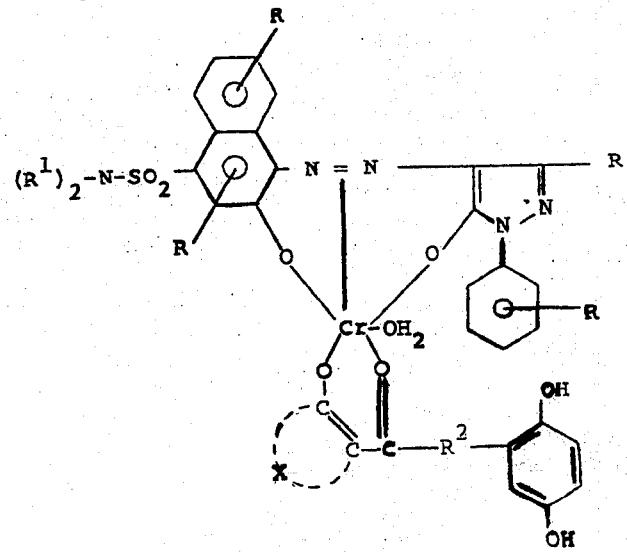

where each R is the same or different substituent chosen from the group consisting of hydrogen, alkyl having from 1–6 carbon atoms or alkoxy having from 1–6 carbon atoms, each $R^1$ is hydrogen, alkyl having 1–6 carbon atoms or alkanol having 1–6 carbon atoms, $R^2$ is alkylene having 1–6 carbon atoms and X represents the atoms to complete cyclopentyl or cyclohexyl: the improvement wherein said reaction is performed in the presence of a weakly basic anion exchange resin.

2. A process of claim 1 wherein the first named compound is:

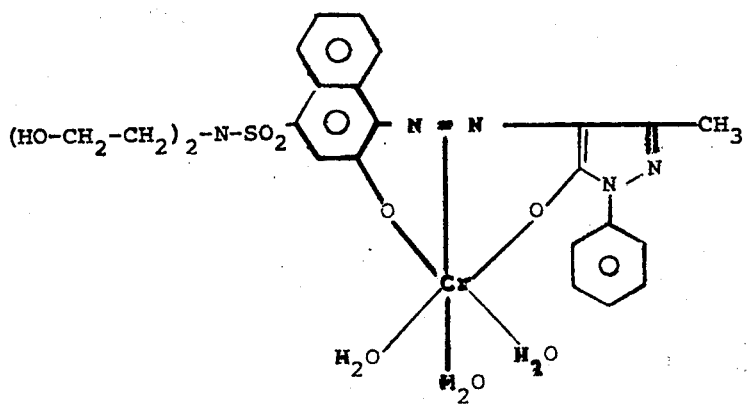

3. A process of claim 1 wherein the second named compound is:

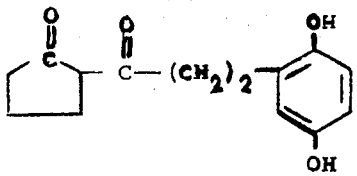

4. A process comprising the steps of reacting a compound of the formula:

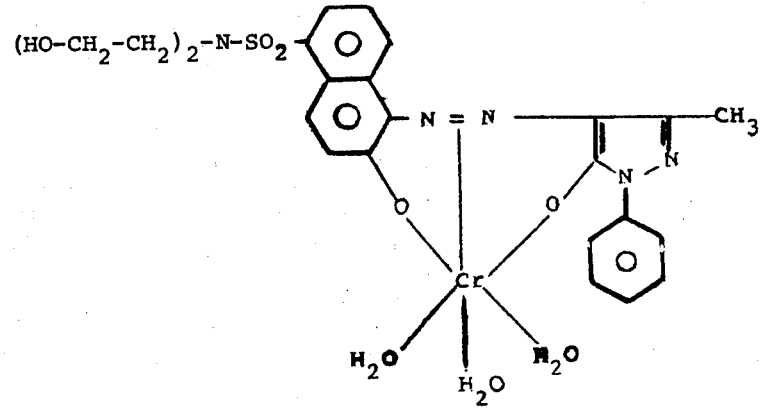

with a compound of the formula:

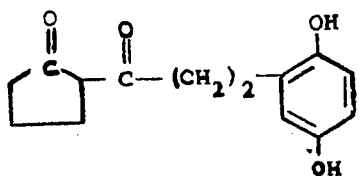

in the presence of a weakly basic anion exchange resin to provide a compound of the formula

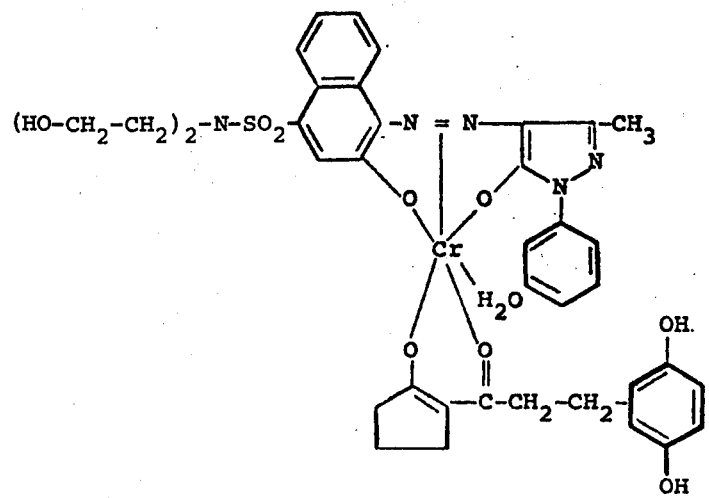

* * * * *